(12) United States Patent
Roeglinger et al.

(10) Patent No.: US 12,395,559 B2
(45) Date of Patent: Aug. 19, 2025

(54) MESH ROUTER FOR CONNECTING TO A MESH NETWORK

(71) Applicant: Rohde & Schwarz GmbH & Co. KG, Munich (DE)

(72) Inventors: Sebastian Roeglinger, Pfaffenhofen (DE); Bjoern Schmid, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/312,743

(22) Filed: May 5, 2023

(65) Prior Publication Data

US 2024/0372917 A1   Nov. 7, 2024

(51) Int. Cl.
*H04L 12/70* (2013.01)
*H04L 45/74* (2022.01)
*H04L 67/12* (2022.01)
*H04L 69/085* (2022.01)
*H04L 69/16* (2022.01)
*H04L 69/18* (2022.01)
(Continued)

(52) U.S. Cl.
CPC ............. *H04L 67/12* (2013.01); *H04L 69/16* (2013.01); *H04L 69/18* (2013.01); *H04W 12/06* (2013.01); *H04W 12/08* (2013.01); *H04W 84/18* (2013.01); *H04L 2463/082* (2013.01); *H04W 12/009* (2019.01)

(58) Field of Classification Search
CPC ... H04L 67/12; H04L 2463/082; H04L 69/18; H04L 69/085; H04L 45/74; H04L 69/16; H04W 12/009; H04W 12/06; H04W 12/08; H04W 84/18

USPC ......................................................... 709/201
See application file for complete search history.

(56) References Cited

U.S. PATENT DOCUMENTS 6,031,843 A    2/2000   Swanbery et al.
6,754,757 B1   6/2004   Lewis
(Continued)

FOREIGN PATENT DOCUMENTS

CN   106979034 A   7/2017
CN   107197007 A   9/2017
(Continued)

*Primary Examiner* — Ario Etienne
*Assistant Examiner* — Elizabeth Kassa
(74) *Attorney, Agent, or Firm* — Studebaker Brackett PLLC

(57) ABSTRACT

The disclosure relates to a mesh router for connecting to a mesh network. The mesh router includes communication interfaces including at least a first communication interface to receive and/or transmit data according to IP based communication protocol, and at least a second communication interface to receive and/or transmit data according to non-IP based communication protocol. The mesh router is directly or indirectly connected one further node via at least one of the communication interfaces; and configured to adapt a data stream received via the first communication interface according to the non-IP based communication protocol and forward the data stream via the second communication interface, and to adapt a data stream received via the second communication interface according to the IP based communication protocol and forward the data stream. The disclosure relates to a measurement and/or auxiliary device including a mesh router and to a mesh communication system.

12 Claims, 3 Drawing Sheets

(51) Int. Cl.
*H04W 12/06* (2021.01)
*H04W 12/08* (2021.01)
*H04W 84/18* (2009.01)
*H04W 12/00* (2021.01)

(56) References Cited

U.S. PATENT DOCUMENTS

| | | | |
|---|---|---|---|
| 7,548,545 | B1 | 6/2009 | Wittenschlaeger |
| 2004/0042448 | A1 | 3/2004 | Lebizay et al. |
| 2004/0090928 | A1 | 5/2004 | Drottar et al. |
| 2007/0233927 | A1 | 10/2007 | Fallah-Adl et al. |
| 2008/0025330 | A1 | 1/2008 | Wang |
| 2011/0188620 | A1 | 8/2011 | Welland |
| 2012/0106562 | A1 | 5/2012 | Laor et al. |
| 2012/0233514 | A1 | 9/2012 | Patil et al. |
| 2012/0236768 | A1* | 9/2012 | Kolavennu ........... H04W 76/14 |
| | | | 370/310 |
| 2013/0297847 | A1 | 11/2013 | Koritnik et al. |
| 2014/0200036 | A1* | 7/2014 | Egner ................... H04W 8/245 |
| | | | 455/456.3 |
| 2016/0094398 | A1* | 3/2016 | Choudhury ............. H04L 45/42 |
| | | | 370/254 |
| 2016/0217093 | A1 | 7/2016 | Whittington et al. |
| 2017/0069197 | A1* | 3/2017 | Pettigrew ................ H04L 12/40 |
| 2019/0245836 | A1* | 8/2019 | Erickson ............... H04W 76/14 |
| 2020/0267641 | A1* | 8/2020 | Strong .................. H04W 24/02 |
| 2023/0199610 | A1* | 6/2023 | Hui ..................... H04L 12/2807 |
| | | | 370/328 |
| 2023/0208808 | A1* | 6/2023 | Jonytis ................ H04L 63/0227 |
| | | | 726/13 |
| 2023/0325345 | A1* | 10/2023 | Wang .................. G06F 15/7867 |
| | | | 370/392 |
| 2024/0162716 | A1* | 5/2024 | Krasko ..................... H02J 3/28 |

FOREIGN PATENT DOCUMENTS

| | | |
|---|---|---|
| CN | 213814795 U | 7/2021 |
| CN | 217085670 U | 7/2022 |
| CN | 114967545 A | 8/2022 |
| CN | 217643730 U | 10/2022 |
| RU | 208641 U1 | 12/2021 |

\* cited by examiner

MESH ROUTER FOR CONNECTING TO A MESH NETWORK

TECHNICAL FIELD

The disclosure relates to a mesh router for connecting to a mesh network and to a measurement and/or auxiliary device comprising such a mesh router. The disclosure father relates to a communication system comprising a plurality of such measurement and/or auxiliary devices forming a mesh network.

BACKGROUND ART

Test and measurement (T&M) systems can comprise a large number of different test and measurement devices, such as probes, front-end devices, signal generators, signal analyzers, protocol testers, VNAs or oscilloscopes. All of these devices can be interconnected to exchange information.

The configuration and setup of such a T&M system is often done manually and can be quite complex. If the configuration of certain devices changes or if a new device is added to the system, all devices in the system need to be re-configured manually to accommodate to this change. To carry out such configurations, knowledge and experience about the system is required. Furthermore, T&M systems are often controlled by a central controller which can introduce a single point of failure in the system.

SUMMARY

Thus, there is a need to enable measurement and/or auxiliary devices to network more efficiently and, in particular, to avoid the above-mentioned disadvantages.

This is achieved by the embodiments provided in the enclosed independent claims. Advantageous implementations of the present disclosure are further defined in the dependent claims.

According to a first aspect, the present disclosure relates to a mesh router for connecting to a mesh network, comprising a plurality of communication interfaces. The plurality of communication interfaces comprises at least a first communication interface adapted to receive and/or transmit data according to an IP based communication protocol, and at least a second communication interface adapted to receive and/or transmit data according to a non-IP based communication protocol. The mesh router is directly or indirectly connected to at least one further node in the mesh network via at least one of the communication interfaces; and is configured to: adapt a data stream received via the first communication interface according to the non-IP based communication protocol and forward said data stream via the second communication interface, and to adapt a data stream received via the second communication interface according to the IP based communication protocol and forward said data stream via the first communication interface.

This achieves the advantage that the mesh router can directly or indirectly connect a variety of devices and system in a mesh network, even if these devices and system communicate via different network technologies, e.g., different communication protocols. For example, such mesh routers can be connected to or implemented in various measurement and/or auxiliary devices of a T&M system. The measurement and/or auxiliary devices can then be interconnected via the mesh routers to form a mesh network for exchanging information and control commands.

The mesh router can comprise a processing unit which is configured to adapt the data streams according to the IP based respectively the non-IP based communication protocols. In other words, the processing unit can be configured to adapt the data received via the IP based protocol at the first interface such that it can be forwarded via the non-IP based protocol at the second interface and vice versa. For example, thereby data is first extracted from the received data stream, e.g. by extracting the relevant data packets from the media layers of the network stack, and subsequently a data stream comprising this data and conforming to the communication protocol of the transmitting interface is generated and transmitted.

The mesh router, in particular the processing unit, can comprise one or more network stacks or can be configured to implement one or more network stacks (also: protocol stacks), wherein the network stacks comprise communication layers of the IP based communication protocol and/or the non-IP based communication protocol.

The data stream that is forwarded by the mesh router can comprise any type of information, such as IQ data, control commands, configuration data, safe sets, or licenses.

The communication interfaces can be endpoints of the mesh router which are capable of addressing the IP based and non-IP based communication protocols.

The mesh router can comprise a plurality of first communication interfaces and/or a plurality of second communication interfaces. The mesh router can be configured to adapt a data stream received via one of the first communication interfaces according to the non-IP based communication protocol and forward said adapted data stream via one of the second communication interfaces, and to adapt a data stream received via one of the second communication interfaces according to the IP based communication protocol and forward said adapted data stream via one of the first communication interfaces.

The further node can be any further device in the mesh network, e.g. a further mesh router or a measurement and/or auxiliary device which can comprise a further mesh router. For instance, the first communication interface can be connected to a further mesh router in the mesh network and/or the second communication interface can be connected to a measurement and/or auxiliary device, wherein the mesh router forwards data between these two devices.

In an embodiment, the first interface is a cellular network interface, such as a 5G interface, or a WiFi interface or an Ethernet interface.

The IP based communication protocol can be a wireless or a wire-bound IP protocol. The IP protocol can be an IPV4 or IPv6 based protocol, for example TCP/IP.

In an embodiment, the second interface is a SPI interface, a PCIe interface, a I2C interface, a PCI interface or a UART interface.

The non-IP based protocol can be a hardware protocol and/or a bus protocol, e.g., a USB protocol. For example, the non-IP based protocol can be a board based protocol.

In an embodiment, the mesh router is directly or indirectly connected to a cloud mesh router via one of the communication interfaces. The mesh router can receive data from or forward data to the cloud mesh router.

In an embodiment, the mesh router is directly or indirectly connected to at least one data storage in the mesh network via one of the communication interfaces; wherein the mesh router is configured to transmit data to and/or read data from the at least one data storage.

For example, the data storages can be integrated in any device, e.g. measurement and/or auxiliary device, in the mesh network. The mesh router can manage an access to these data storages, e.g., to save sets and/or IQ files, load waveforms, access configuration settings and/or licenses.

In an embodiment, the mesh router is configured to manage an access of an external device which is connected to one of the communication interfaces, in particular to the second communication interface, to the mesh network.

For example, the external device is a measurement and/or auxiliary device which is connected to a PCI express interface of the mesh router. If access is granted to the external device it can become a part of the mesh network.

In an embodiment, the mesh router is configured to issue a floating license for accessing the mesh network to the external device, and to revoke or release the floating license if the external device is disconnected from the mesh router.

A number of floating licenses can be stored in the at least once data storage, e.g. in form of a license pool. As soon as a floating license is revoked or released form the external device (e.g., due to disconnecting the device), the floating license can be added back to the license pool. Preferably, this floating license allocation can be performed automatically and does not have to be initiated by an operator or user.

In particular, the processing unit of the mesh router can be configured to read/write data in the data storage, to manage the access of the external device and/or to issue/revoke the floating license to/from the external device.

In an embodiment, the mesh router is configured to grant access of the external device to the mesh network if the external device is of an allowable device type or role. This achieves the advantage that devices which fulfill a certain roles in a measurement system can automatically be granted access to the mesh network of the system without a user having to manually change any configurations. The allowable device types or roles can be stored the at least one data storage.

In an embedment, the mesh router comprises or is connected to at least one user interface; wherein the mesh router is configured to only grant access of the external device to the mesh network if a user confirmation is received on the user interface. In this way, for example, a user which has access to the measurement system can manage, in particular confirm, the access of new devices.

In an embodiment, upon detecting the connection of the external device, the mesh router is configured to initiate a transmission of a message to a user device which is not part of the mesh network; wherein the mesh router is configured to only grant access of the external device to the mesh network if additionally user confirmation based on the issued message is received on the at least one user interface. This achieves the advantage that a two-factor authentication for adding new devices to the mesh network can be implemented which enhances the network security.

The message can be transmitted via a special interface of the mesh router or a connected device.

According to a second aspect, the present disclosure relates to measurement and/or auxiliary device comprising at least one mesh router according to the first aspect of the disclosure for connecting the measurement and/or auxiliary device to the mesh network.

In an embodiment, the measurement and/or auxiliary device is any one of the following devices: a probe, an internal or external front-end, a signal generator, a laptop, an oscilloscope, a vector network analyzer (VNA), a protocol tester, a signal analyzer, an amplifier, a mixer or a splitter. The amplifier, mixer and/or splitter can be external devices.

The mesh router can be implemented via software and/or hardware. For instance, the communication interfaces and/or the processing unit can be components of the measurement and/or the auxiliary device.

In an embodiment, the measurement and/or auxiliary device is directly or indirectly connected to at least one further measurement and/or auxiliary device in the mesh network via one of the communication interfaces.

Each of the at least one further measurement and/or auxiliary devices can comprise or implement a mesh router according to the first aspect of the disclosure. The measurement and/or auxiliary devices can be interconnected via their first (IP based) communication interfaces.

In an embodiment, the measurement and/or auxiliary device is adapted to remotely control and/or configure the at least one further measurement and/or auxiliary device, and the measurement and/or auxiliary device is adapted to being remotely controlled and/or configured by the at least one further measurement and/or auxiliary device.

Preferably, the thus connected measurement and/or auxiliary devices of the mesh network can control and/or configure each other and there is no central controller, such as a centralized server, for all devices in the network (i.e., no top-down approach) or a redundancy setup with a second controller. This achieves the advantage that there is no single point of failure for controlling/configuring the devices in the network.

For instance, the measurement and/or auxiliary device can access any data storage of a further measurement and/or auxiliary device in the system, e.g., to store or read saved files, such as IQ files, or to access and/or change configuration setting or licenses, such as the floating licenses.

According to a third aspect, the present disclosure relates to a mesh communication system, comprising a plurality of measurement and/or auxiliary devices according to the second aspect of the disclosure, wherein the plurality of measurement and/or auxiliary devices are directly or indirectly connected via their respective mesh routers to form a mesh network.

For instance, the mesh routers of the mesh communication system can enable a seamless multi-hop communication via different physical communication technologies.

The mesh communication system can be a T&M (test and measurement) system. The plurality of measurement and/or auxiliary devices can be devices in the mesh network which are connected to the mesh network and, as such, directly or indirectly with each other. The connection can be established via the respective communication interfaces of the mesh routers.

The system may comprise and/or be connected to further nodes in the mesh networks, e.g., endpoint devices without a mesh router or remote data storages.

For example, each one of the measurement and/or auxiliary devices is configured for remotely controlling and/or configuring each other one of the measurement and/or auxiliary devices of the mesh communication system.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
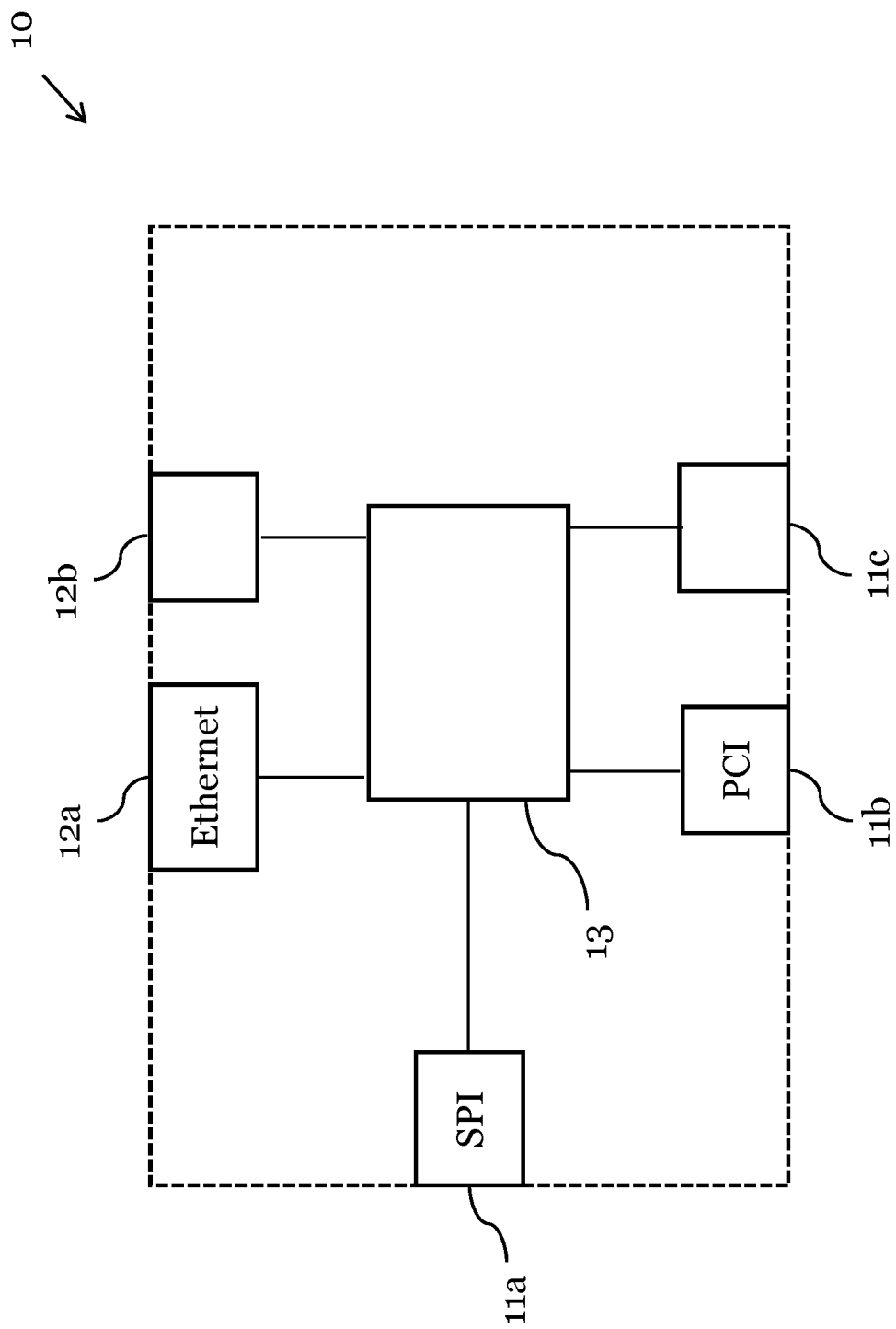
FIG. 1 shows a schematic diagram of a mesh router according to an embodiment.

FIG. 1 shows a schematic diagram of a mesh router 10 according to an embodiment. The mesh router 10 can be used to connect a device, such as a measurement or an auxiliary device, to a mesh network.

The mesh router 10 comprises a plurality of communication interfaces which comprise at least a first communication interface 12a, 12b adapted to receive and/or transmit data according to an IP based communication protocol, and at least a second communication interface 11a, 11b, 11c adapted to receive and/or transmit data according to a non-IP based communication protocol. The mesh router 10 is directly or indirectly connected to at least one further node in the mesh network via at least one of the communication interfaces 11a-c, 12a-b. The mesh router 10 is further configured to adapt a data stream received via the first communication interface 12a, 12b according to the non-IP based communication protocol and forward said data stream via the second communication interface 11a, 11b, 11c, and to adapt a data stream received via the second communication interface 11a, 11b, 11c according to the IP based communication protocol and forward said data stream via the first communication interface 12a, 12b.

In the example shown in FIG. 1, the mesh router comprises two IP based communication interfaces 12a, 12b (i.e., first communication interfaces) which comprise at least one Ethernet interface, and three non-IP based communication interfaces 11a, 11b, 11b (i.e., second communication interfaces) which comprise a SPI and a PCI interface. However, any other type and number of IP based and non-IP based communication interfaces is possible.

For instance, the IP based interfaces can further comprise a WiFi interface, a 3G interface, a 4G interface and/or a 5G interface. The IP based interfaces can comprise wire-bound and/or wireless interfaces.

The non-IP based interfaces can be board based interfaces, i.e. interface types usually used to connect devices to a motherboard or PCB. The non-IP based interfaces can be bus based interface types and can be adapted for bus based communication protocols, e.g. universal serial bus (USB). For instance, the non-IP based interfaces can further comprise a PCIe interface, an IEEE488 (GPIB) interface, a SPI (serial peripheral interface), a I2C (Inter-Integrated Circuit) interface, a Bluetooth interface, a serial interface and/or a UART (Universal Asynchronous Receiver/Transmitter) interface.

The mesh router 10 can comprise a processing unit 13, e.g. a microprocessor. The processing unit can be configured to adapt the respective data streams to the IP based respectively non-IP based communication protocols.

For example, the mesh router 10 comprises a network stack including each necessary communication layer of the IP based respectively non-IP based communication protocols. The router 10, in particular the processing unit 13, can be configured to implements the network stack in order to forward the data streams received via the different communication technologies respectively protocols.

The mesh router 10 as shown in FIG. 1 can be implemented in or comprised by a measurement and/or an auxiliary device, in particular a test and measurement (T&M) device of a T&M system. A device which comprises a mesh router 10 can be referred to as TMMB (T&M mesh box). An auxiliary device comprising a mesh router 10 can also form a standalone router device with no additional measurement capabilities.

The mesh router can be implemented via software and/or hardware in the measurement and/or auxiliary device. For instance, the communication interfaces 11a-c, 12a-b and/or the processing unit 13 can be components of the measurement and/or the auxiliary device. If the mesh router is implemented via software it can form a mesh router service which can be executed by a processor of the measurement and/or auxiliary device.

Multiple devices which each comprise one or more mesh routers 10 as shown in FIG. 1 can be connected to form a mesh network. Thereby, each device in the mesh network can act as router and can receive and transmit data between its neighboring notes. The different devices in the network can be connected via the different IP and non-IP based interface technologies. Such a mesh network preferably requires no topology (i.e., no central or primary controller) and can react dynamically to network changes without restarting any device in the mesh.

The mesh router 10 and/or the device that comprises the mesh router can have a unique ID, e.g. referred to as TMMB-ID, which can be used to identify the router 10 and/or the device in the mesh network.

When adapting a received data stream to the IP based or the non-IP based communication protocol, the mesh router 10 or, more specifically, the processing unit 13 can be configured to map the unique ID to a suitable address scheme and/or address format of the respective communication protocols. For instance, the mesh router 10 can map the unique ID to a transport layer and/or a physical layer of the respective network stack of the IP based and/or non-IP based communication protocol which is used for forwarding data. The unique ID can thereby be mapped or converted to a suitable address format according to the IPv4 or IPv6 protocols or according to the PCI standard (or whichever protocol is used).

The layer stack, in particular, of the IP based protocol that is implemented by the mesh router 10 can comprise application level layers (e.g., for browsers, etc.) and an IP network level layer (e.g., for Ethernet or WiFi communication). The non-IP based communication standard can be a SPI standard, a UART standard or a PCI standard, in particular a PCI express or a PXI (PCI Extensions for Instrumentation) standard. For example, a device, such as a host PC, in the mesh network can comprise a SPI interface for connecting a probe and a PCI interface to access each card and/or an IP based interface, e.g. Ethernet, to connect the PC to the mesh network.

If a measurement and/or auxiliary device consist of several sub-units, e.g. box, auxiliary device, such as probes or virtual instruments, external frontend, each of these sub-units can have its own mesh address in the form of a separate TMMB-ID. Thus, each sub-unit can be part of the mesh network.

A measurement and/or auxiliary device which comprises the mesh router 10 can be directly or indirectly connected to further devices in the mesh network via one of the communication interfaces 11a-c, 12a-b. The further devices can be further measurement and/or auxiliary device which can each comprise a respective mesh router 10.

The measurement and/or auxiliary devices in the mesh network can be authorized and configured to control and/or configure each other. Thus, there is no need for a centralized control unit (e.g., a central server) for controlling/configuring the devices.

Furthermore, each measurement and/or auxiliary device can forward data, for example, to a server database which is connected to the mesh network, without being commanded to do so, and/or can use a scalable signal analysis cluster connected to the mesh network.

Figure 2:
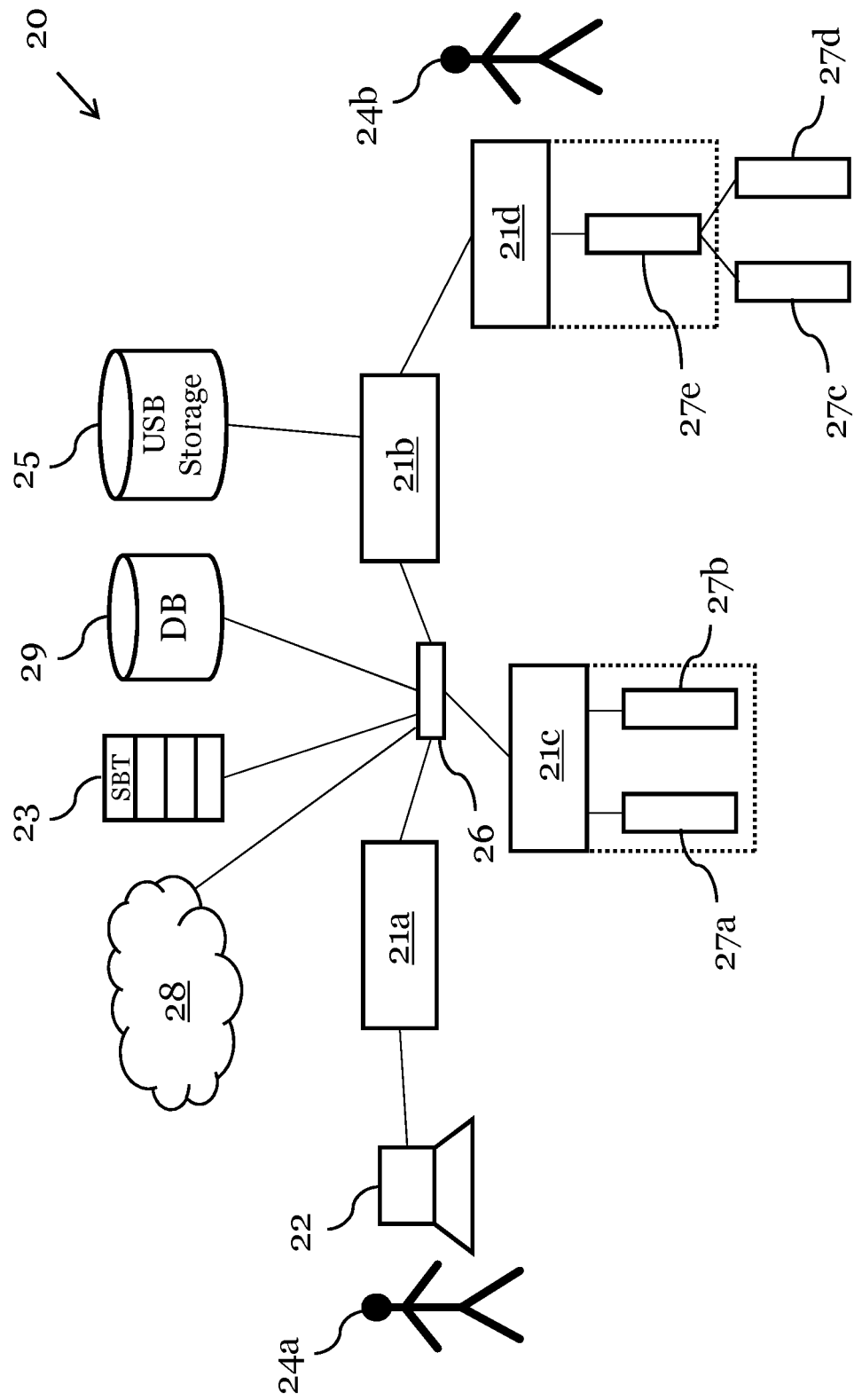
FIG. 2 shows a schematic diagram of a mesh communication system according to an embodiment.

FIG. 2 shows a schematic diagram of a mesh communication system 20 according to an embodiment.

The mesh communication system 20 comprises a plurality of measurement and/or auxiliary devices 21a-d, wherein each of the measurement and/or auxiliary devices 21a-d comprises a mesh router 10 as, e.g., shown in FIG. 1. The measurement and/or auxiliary devices 21a-d can be directly or indirectly connected via their respective mesh routers 10 to form a mesh network.

The communication system 20 can form a T&M system, wherein the T&M devices of the system are connected via the mesh network.

The measurement and/or auxiliary devices 21a-d can be any one of the following devices: a probe, an internal or external front-end, a signal generator, a laptop, an oscilloscope, a vector network analyzer, a protocol tester, a signal analyzer, an external amplifier, an external mixer or an external splitter. Any one of the devices 21a-d can also be a standalone mesh router 10, e.g., in a housing with no additional measurement function.

The exemplary system 20 shown in FIG. 2 comprises four measurement and/or auxiliary devices 21a-d, wherein each of these devices 21a-d comprises a mesh router 10. These devices 21a-d can be connected to each other via their IP based communication interface, e.g. over a network switch 26 to form a mesh network. For example, device 21c is connected to two additional auxiliary devices 27a, 27b e.g. via its non-IP based interfaces. The auxiliary devices 27a, 27b can or cannot comprise a mesh router 10. For example, device 21c connects to auxiliary device 27a via a SPI interface and to auxiliary device 27b via PCI interface. The devices 27a, 27 could be probes or other measurement devices of a measurement system.

In the example shown in FIG. 2, the device 21d comprises an additional (internal) auxiliary device 27e, e.g., internally connected to the device 21d via a PCI interface, wherein addition auxiliary devices 27c, 27d can be connected to the device 21d via, e.g., SPI interfaces provided by auxiliary device 27e. The device 21d can manage the access of all of these auxiliary devices 27c-e to the mesh network via its mesh router 10.

The exemplary system 20 shown in FIG. 2 further comprises a computing device 22 which is connected to the mesh network via one of the measurement and/or auxiliary devices 21a, e.g., via a SPI connection to the device 21a. The system 20 can further comprise a scalable signal analysis cluster 23 and a database 29, e.g. connected to the switch 26 via a Ethernet connection. The system 20 can further comprise an external data storage 25, e.g., a USB storage, which can be connected to a non-IP interface of one of the devices 21a-d. For example, the mesh routers 10 of all devices 21a-d can manage access to the data storage 25 to read and/or write files in the data storage, e.g. files from a connected auxiliary device 27d.

It is to be noted that FIG. 2 only shows an exemplary configuration of the mesh communication system 20. The system 20 could comprise any number of interconnected measurement and/or auxiliary devices 21a-d, each comprising one or more mesh routers 10, and any number of additional (external) devices or nodes being connected to one or more of the devices 21a-d.

Each mesh router 10 in one of the devices 21a-d of the system 20 can be configured to manage an access of an external device, e.g. one of the auxiliary devices 27a-d, which is connected to an communication interfaces of the router 10 to the mesh network. In this way, an easy joining of a new devices A, such as auxiliary devices 27a-d, to the existing mesh network M can be enabled by connecting the new device A to one network device B (e.g., device 21c). The mesh routers 10 of devices A and B can establish a connection and exchange routing information and B can promote the existence of A in the mesh M.

Furthermore, each measurement and/or auxiliary device 21a-b which comprises a mesh router 10 can enable a joining of at least two mesh networks. For example, if two mesh networks M and N are connected by connecting the devices A and B, wherein device A is a device (with a mesh router 10) of mesh network M and device B is a device (with a mesh router 10) of mesh network N, a new joint mesh network O can be created which can include all devices of mesh networks M and N.

In a further example, additional devices can be added to the system 20 via a cloud connection. As shown in FIG. 2, the system 20 can comprise a cloud mesh router 28 which is connected to the devices of the system 20. The cloud mesh router 28 can be a cloud service that acts as a mesh router. At least one of the devices A of the mesh network M can establish a connection to the cloud mesh router 28 for the cloud router 28 to become a part of the mesh network. If an additional external device B (not shown in FIG. 2) establishes a connection to the cloud mesh router 28, B can also become a part of the mesh network M. This can be controlled by session handling wherein device B e.g. only connects to the mesh network if it requests to be part of the mesh M. For example, the cloud mesh router 28 can enable a remote control of the measurement and/or auxiliary devices in the mesh network. In this way, measurement setups can distribute over large distances and can be connected via cloud without huge effort and setup specific solutions.

For example, the cloud mesh router 28 can also be used to join two mesh networks M and N to form a joint mesh network O. A user can choose to create the new mesh and/or to authenticate the new mesh network via the cloud router 28 which can act as dedicated router that both mesh networks M and N have to establish a connection with. Optionally, both mesh networks M and N need to agree and authenticate when joining.

Joint mesh networks can also be split. For example, if there are two devices A and B which are part of a mesh network M and the connection between devices A and B is the only connection between a first part of mesh network M, in the following called M1, and a second part of mesh network M, in the following called M2, then M1 and M2 can form disjunct subsets of M. If devices A and B are disconnected, the two sub-meshes M1 and M2 can operate separate and independently from each other. In that case the mesh routers of devices A and B can propagate the split in their sub-meshes M1 and M2, such that all devices of M1 and M2 are informed that devices of the other sub-mesh are no longer reachable. For instance, devices A and B can be disconnected only after the last connection between M1 and M2 is severed.

Furthermore, the mesh router 10 in the system 20 can have an access control feature. For example, if a new device A (e.g., one of the auxiliary devices 27a-d) is connected to the mesh network M (formed by the connected devices 21a-d of the system 20) and the routers 10 have enabled the access control feature, an authentication is necessary before access is granted for A.

For instance, if the grant-access feature is enabled, a user or operator 24b of the newly connected device A (e.g., one of the auxiliary decides 27c-d) must have access to at least one device B (e.g., device 21d) of the mesh M. After A is connected to M, a grant-access pop-up message can be shown on device B and access of A to M can be granted or declined. To implement this feature, the system 20 can comprise or be connected to at least one user interface which can be configured to show the grant-access pop-up message. The system 20 and, in particular, the first mesh router 10 that the device A is connected to can be configured to only grant access of the external device to the mesh network if a user confirmation is received on the user interface.

The communication system 20 can further comprise a role-model feature. For example, if the role-model feature is enabled, and the newly connected device A is configured as role R, wherein R is a role in the mesh network M with access rights, then access of A to M will be granted. In other words, the mesh routers 10 of the system 20 are configured to grant access of an external device to the mesh network if the external device is of an allowable device type or role. The roles or device types with access rights could be managed via a cloud based role manager service.

For instance, at least one device in the mesh network can comprise a list of roles or persons allowed to have access to the mesh. Once access is granted to a new device, it can forward control commands to the other devices in the network using the SCPI (Standard Commands for Programmable Instruments) standard. Optionally, encryption can be added to this communication.

Furthermore, the system 20 can comprise a two-factor authentication feature. For example, if the two-factor-authentication feature is enabled, the grant-access feature or the role-model feature can be executed and, additionally, a second communication channel can be used that is not part of the mesh network. E.g., an email from one device of the mesh network M can be sent to the operator O of newly connected device A with a random access number N. Once the operator O enters the random access number N e.g. in device A, access of A to mesh network M is granted. This features requires a communication over a network which is not part of the mesh network for an authentication via a "second factor".

For the above authentication purposes of new devices, floating licenses could be exchanged and/or shared between all devices within the mesh network without any further configurations. For example, the mesh router 10 of any device 21a-d in the communication system 20 can be configured to issue a floating license for accessing the network to an external device (e.g., the computing device 22) which is connected to the device 21a, and to revoke or release the floating license if the external device is disconnected from the device 21a. In this way, a user 24a of the (previously) external device 22 can access the mesh network e.g. to access files stored by the network devices. For example, another user 24b with direct access to one of the network devices 21d can grant access to device 22 via the grant-access feature (i.e., by confirming the access on a user interface of the system 20).

Once the external device 22 is authenticated, it can access the mesh network, e.g., to remote control one or more auxiliary devices 27c that are connected to the mesh network. For example, the user 24a can start the configuration on a node A (e.g. a local display of device 22) within the mesh network and continue the configuration on any other configuration enabled device within the mesh network.

Besides the optional user confirmation when connecting an external device, any granting of access of external devices can be managed automatically by the system 20 which increases the ease of use of the system 20. Furthermore, the mesh operator does not need full knowledge over the network.

If the mesh communication system 20 is connected to or comprises the cloud mesh router 28, the configuration could also be done on any device with internet access that can communicate with the cloud router 28. Thus, there is no need for local LAN access. The system 20 could comprise a firewall at a node that is connected to the cloud mesh router 28.

Preferably, all system 20 capabilities and devices 21a-d could be used and/or accessed across the mesh network without requiring any further configuration. In particular, any kind of data could be transferred across the mesh network without any further configurations. The measurement and/or auxiliary devices 21a-d of the system 20 can comprise IQ sources (e.g., signal and spectrum analyzer or vector network analyzer devices), IQ sinks (e.g. signal generators or VNA devices) and/or digital signal processing (DSP) devices (e.g., apps/services that provide pulse analysis, EVM) which generate IQ files or save files. For example, the save files or IQ files can be accessed and/or stored in a connected operator laptop 22 even if the operator 24a controls does not have direct (physical) access to all measurement and/or auxiliary devices 21a-d of the system 20. In particular, no USB-stick or OS file sharing has to be configured by the operator 24a.

Furthermore, the network resources (e.g. computing power) could be shared between the connected nodes of the mesh network; e.g. a device enabled scalable signal analysis cluster could be connected to the mesh network. The mesh network can make it easier to create redundancies, e.g., on the link between devices and devices that act as controllers. Furthermore, IP communication can be tunneled between all devices in the mesh network. So, any device in the mash network can be remote controlled via industry standard technologies, such as SCPI or other remote control systems. Since all measurement and/or auxiliary devices are addressable in the mesh network, also those device can be remotely controlled individually.

Figure 3:
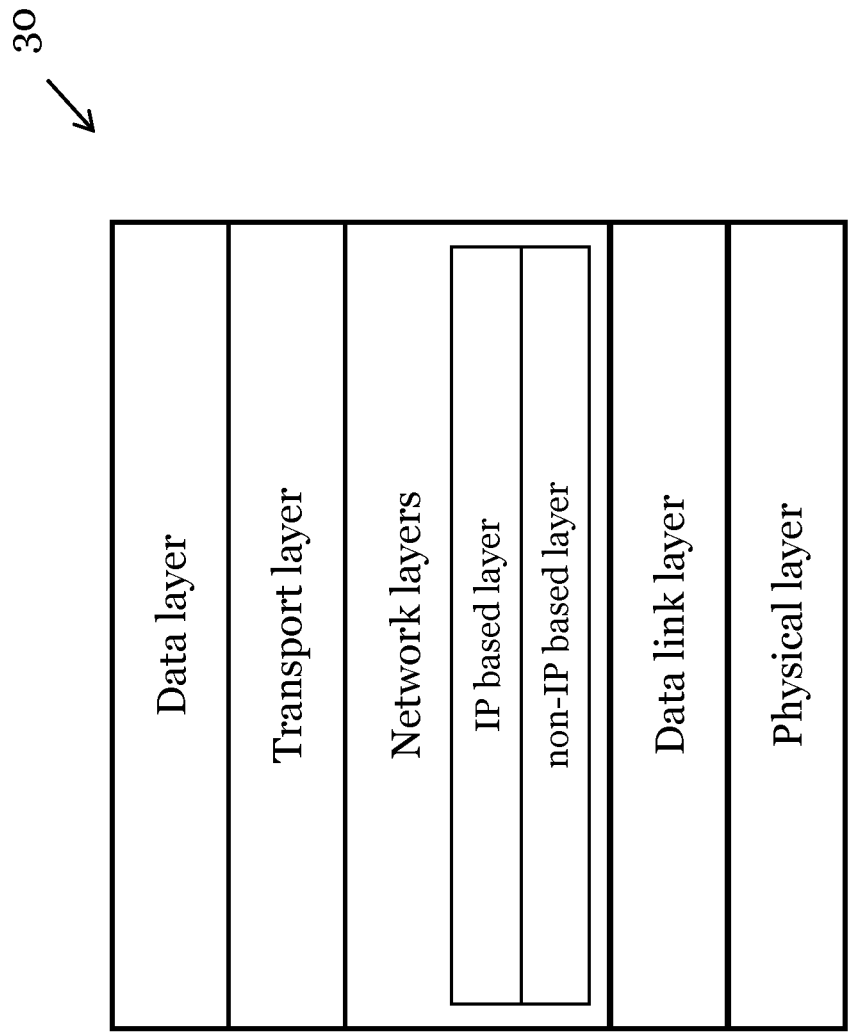
FIG. 3 shows a schematic diagram of a protocol stack according to an embodiment.

For example, FIG. 3 shows an exemplary protocol stack 30 which can be implemented respectively used by each of the mesh routers 10 in the network for communication. The protocol stack 30 can comprise media layers, e.g. data and transport layers, and host layers, e.g. network, data link and physical layers. The network layer can be configured for IP based and for non-IP based data routing, such that a communication according to the IP based and to the non-IP based communication protocol is enabled. For example, the network layer can be subdivided into an IP based and a non-IP based layer, wherein the IP based layer enables IP based communication and the non-IP based layer enables non-IP based communication (e.g., according to the board based protocol).

Any communication between two devices in the mesh network can utilize the IP based and/or the non-IP based protocol layer, e.g., depending on the type of devices in a communication chain and/or their position in the mesh network. For instance, IP based communication enabled by the "IP layer" can be used for forwarding data between IP devices in the communication chain until a last possible hop for the IP based communication is reached. For example, at the last possible hop, the data should be forwarded to a non-IP enabled device (e.g., a measurement probe). To forward the data to the non-IP device, the communication can be switched to the non-IP based protocol (e.g., a board based protocol such as USB) which is enabled by the "non-IP layer". Switching between IP and non-IP based communication could be carried out by transferring data from the IP based layer to the non-IP based layer (and vice versa) when necessary.

All features described above or features shown in the figures can be combined with each other in any advantageous manner within the scope of the disclosure.

The invention claimed is:

1. A measurement and/or auxiliary device, comprising:
   at least one mesh router for connecting the measurement and/or auxiliary device to a mesh network;
   wherein the mesh router comprises a plurality of communication interfaces comprising:
      at least a first communication interface adapted to receive and/or transmit data according to an IP based communication protocol, and
      at least a second communication interface adapted to receive and/or transmit data according to a non-IP based communication protocol;
   wherein the mesh router is directly or indirectly connected to at least one further measurement and/or auxiliary device in the mesh network via at least one of the communication interfaces;
   wherein the mesh router is configured to:
      adapt a data stream received via the first communication interface according to the non-IP based communication protocol and forward said data stream via the second communication interface, and to
      adapt a data stream received via the second communication interface according to the IP based communication protocol and forward said data stream via the first communication interface,
   wherein the measurement and/or auxiliary device is adapted to remotely control and/or configure the at least one further measurement and/or auxiliary device,
   wherein the mesh router is configured to manage an access of an external device which is connected to one of the communication interfaces to the mesh network, and
   wherein the mesh router is configured to only grant access of the external device to the mesh network if authentication or user confirmation is completed.

2. The measurement and/or auxiliary device of claim 1, wherein the first interface is a cellular network interface, a WiFi interface or an Ethernet interface.

3. The measurement and/or auxiliary device of claim 1, wherein the second interface is a SPI interface, a PCIe interface, a 12C interface, a PCI interface or a UART interface.

4. The measurement and/or auxiliary device of claim 1, wherein the mesh router is directly or indirectly connected to a cloud mesh router via one of the communication interfaces.

5. The measurement and/or auxiliary device of claim 1, wherein the mesh router is directly or indirectly connected to at least one data storage in the mesh network via one of the communication interfaces; and
   wherein the mesh router is configured to transmit data to and/or read data from the at least one data storage.

6. The measurement and/or auxiliary device of claim 1, wherein the mesh router is configured to issue a floating license for accessing the mesh network to the external device, and to revoke or release the floating license if the external device is disconnected from the mesh router.

7. The measurement and/or auxiliary device of claim 1, wherein, the mesh router is configured to grant access of the external device to the mesh network if the external device is of an allowable device type or role.

8. The measurement and/or auxiliary device of claim 1, wherein the mesh router comprises or is connected to at least one user interface;
   wherein the mesh router is configured to only grant access of the external device to the mesh network if a user confirmation is received on the user interface.

9. The measurement and/or auxiliary device of claim 1, wherein, upon detecting the connection of the external device, the mesh router is configured to initiate a transmission of a message to a user device which is not part of the mesh network;
   wherein the mesh router is configured to only grant access of the external device to the mesh network if additional user confirmation based on the transmitted message is received on the user device.

10. The measurement and/or auxiliary device of claim 1, wherein the measurement and/or auxiliary device is any one of the following devices: a probe, an internal or external front-end, a signal generator, an oscilloscope, a vector network analyzer (VNA), a protocol tester, a signal analyzer, an amplifier, a mixer or a splitter.

11. The measurement and/or auxiliary device of claim 1, wherein the measurement and/or auxiliary device is adapted to being remotely controlled and/or configured by the at least one further measurement and/or auxiliary device.

12. A mesh communication system, comprising:
   a plurality of measurement and/or auxiliary devices of claim 1, wherein the plurality of measurement and/or auxiliary devices are directly or indirectly connected via their respective mesh routers to form the mesh network.

* * * * *